United States Patent [19]

Henry et al.

[11] 4,215,757
[45] Aug. 5, 1980

[54] ATTACHMENT DEVICE FOR RELEASABLY CONNECTING FLEXIBLE SKIRT COMPONENTS TO AN AIR CUSHION VEHICLE

[75] Inventors: John Henry, Cowes; John E. Dadswell, Newport, both of England

[73] Assignee: British Hovercraft Corporation Limited, Yeovil, England

[21] Appl. No.: 967,013

[22] Filed: Dec. 6, 1978

[30] Foreign Application Priority Data

Dec. 28, 1977 [GB] United Kingdom ............... 54021/77

[51] Int. Cl.³ .............................................. B60V 1/16
[52] U.S. Cl. ................................................... 180/127
[58] Field of Search ............... 180/127, 128, 129, 130, 180/116, 123; 280/154.5 R, 154; 160/330, 368 R; 15/340; 16/168, 162, 158

[56] References Cited

U.S. PATENT DOCUMENTS

| | | | |
|---|---|---|---|
| 929,615 | 7/1909 | Madden | 16/158 |
| 1,796,581 | 3/1931 | Siebenlist | 160/380 |
| 2,826,428 | 3/1958 | Lincoln | 280/154.5 R |
| 3,244,248 | 4/1966 | Prickett | 180/127 |
| 3,481,424 | 12/1969 | Barr | 180/128 |

*Primary Examiner*—John J. Love
*Assistant Examiner*—Randall A. Schrecengost
*Attorney, Agent, or Firm*—Larson, Taylor and Hinds

[57] ABSTRACT

An attachment device for releasably connecting a flexible skirt component to rigid body structure of an air cushion vehicle has a plurality of first elements attached at spaced positions on the rigid body structure. A plurality of second elements are attached at spaced positions along an edge portion of the flexible skirt by a plurality of clamping plates which co-operate one with each second element to present a clamping face towards a clamping face on the second element. The edge portion of the flexible skirt is held between the clamping faces by a clamping action applied by releasable fasteners passing through aligned holes in the second elements, the clamping plates and the flexible skirt. The second elements are positioned in the spaces between the first elements so that respective longitudinal passages extending through the first and second elements are aligned, and a pin member is inserted into the aligned passages so as to connect the first and second elements in hinged relationship.

7 Claims, 4 Drawing Figures

ATTACHMENT DEVICE FOR RELEASABLY CONNECTING FLEXIBLE SKIRT COMPONENTS TO AN AIR CUSHION VEHICLE

FIELD OF THE INVENTION

THIS INVENTION relates to an attachment device for releasably connecting a component of a flexible skirt to an air cushion vehicle.

BACKGROUND OF THE INVENTION AND REVIEW OF THE PRIOR ART

U.S. Pat. No. 3,244,248 discloses an attachment device for releasably connecting a flexible skirt to an air cushion vehicle. This attachment device comprizes a plurality of first and second elements having passages extending therethrough, the first elements being attached to rigid body structure of the vehicle so as to be in spaced relationship to each other with their passages aligned, and the second elements being attached in spaced relationship along an edge portion of flexible sheet material forming a component of the flexible skirt so that the passages are aligned with each other. The second elements on the flexible skirt component are positioned in the spaces between the first elements so that the passages in the first and second elements are aligned with each other, and a pin is passed through the passages so as to connect the first and second elements in hinged relationship to each other.

It is the practice on present air cushion vehicles using this attachment device to fasten the second elements to the flexible sheet material of the skirt by rivetting. For the material weight and thickness that is used at present in the manufacture of the skirt this method of fastening has proved adequate to transmit the operational loads acting upon the skirt into the second elements. When the skirt is worn beyond repair and is to be replaced the cost of drilling out the rivets in order to remove the second elements from the worn skirt is not justified, and the second elements are scrapped with the skirt.

With the advent of large sea-going air cushion vehicles, in the 250 tons and above class, the loads acting on the flexible skirt are considerably increased so that it is necessary to make use of stronger flexible sheet materials having higher weight per unit area. If an attachment device of the type disclosed in U.S. Pat. No. 3,244,248 is used to connect the skirt to the vehicle structure it is necessary to increase the size of the elements making up the device, and a large number of rivets, in the order of ten or more, are required to fix each second element to the flexible sheet materials. The increase in the size of the second elements is accompanied by an increase in their cost so that discarding them with a scrapped skirt or skirt part becomes economically undesirable.

SUMMARY OF THE INVENTION

It is an object of the present invention to provide an attachment device for releasably connecting a component of a flexible skirt to rigid body structure of an air cushion vehicle in which those elements of the attachment device which are attached to the flexible skirt component may be readily detached and re-used when the skirt component is replaced.

Accordingly the present invention provides an attachment device for releasably connecting a flexible skirt component to rigid body structure of an air cushion vehicle, said attachment device comprizing a plurality of first elements each having a passage extending therethrough and being arranged for attachment to the rigid body structure of the vehicle so as to be in spaced relationship with next adjacent first elements and with the passages in said first elements substantially aligned, a plurality of second elements each having a passage extending therethrough and being arranged for attachment in spaced relationship to next adjacent second elements along an edge portion of flexible sheet material forming a component of a flexible skirt and with the passages in said second elements substantially aligned, a pin member for insertion in the aligned passages of said first and second elements when said second elements are located in the spaces between the first elements whereby said first and second elements are connected in hinged relationship to each other, and a plurality of clamping plates arranged for co-operation one with each said second element so as to present a clamping face towards a clamping face on said second element whereby in use an edge portion of flexible sheet material forming said skirt component is positioned between said clamping faces and held by a clamping action that is applied by releasable fastening means which pass through aligned holes in said second element, said clamping plate, and said flexible material.

Preferably the clamping faces of each said second element and clamping plate are curved with respect to each other, one face being concave and the other face being convex.

The releasable fastening means may comprise bolts, nuts and washers, and are preferably of the threadless kind such as are presently used for fastening flexible skirt components to each other and wherein a collar is swaged into grooves in the bolt shank so that the bolt can be released only by splitting the collar.

Each said second element and clamping plate may be recessed on its face that is opposed to the clamping face so as to house either the head of the bolt, or a washer and the fastening nut or collar.

The passages extending through the first and second elements may be lined with hardened steel bushes that are removable so that they may be replaced when they become worn by the pin or by face to face wear in an axial sense.

THE DRAWINGS

The accompanying drawings illustrate an embodiment of the invention. In the drawings.

DESCRIPTION OF THE ILLUSTRATED EMBODIMENT

Figure 1:
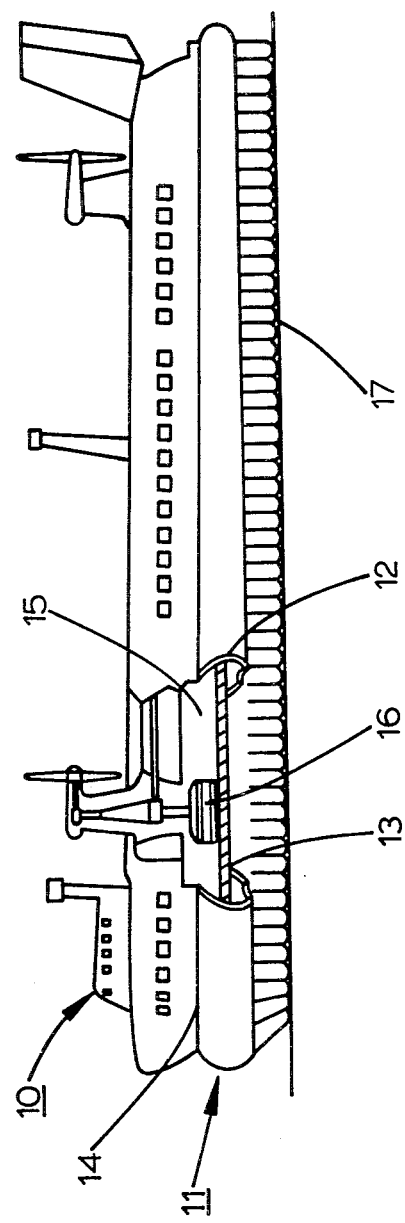
FIG. 1 shows an air cushion vehicle fitted with a flexible skirt.

An air cushion vehicle 10, as shown in FIG. 1, has a flexible skirt 11 for retarding the escape of pressurized air from an air cushion that in operation is formed between the underside of rigid body structure of the vehicle and a surface above which it is supported. The flexible skirt 11 comprizes an inflatable bag member 12 that is manufactured from sheets of fabric reinforced rubber material bolted together in end to end relationship so as to extend around the periphery of the vehicle. The opposed free edges of the bag member are attached to the rigid body structure of the vehicle along attachment lines 13 and 14 so that the sheet material forming the bag member 12 extends across the outlet end of a duct 15 through which pressurized air is delivered to the bag member from a fan 16. A plurality of independent flexible members 17 of the kind known in the art as "fingers" are attached to the bag member 12 so as to depend downwardly therefrom and form a lower part of the flexible skirt 11.

Figure 2:
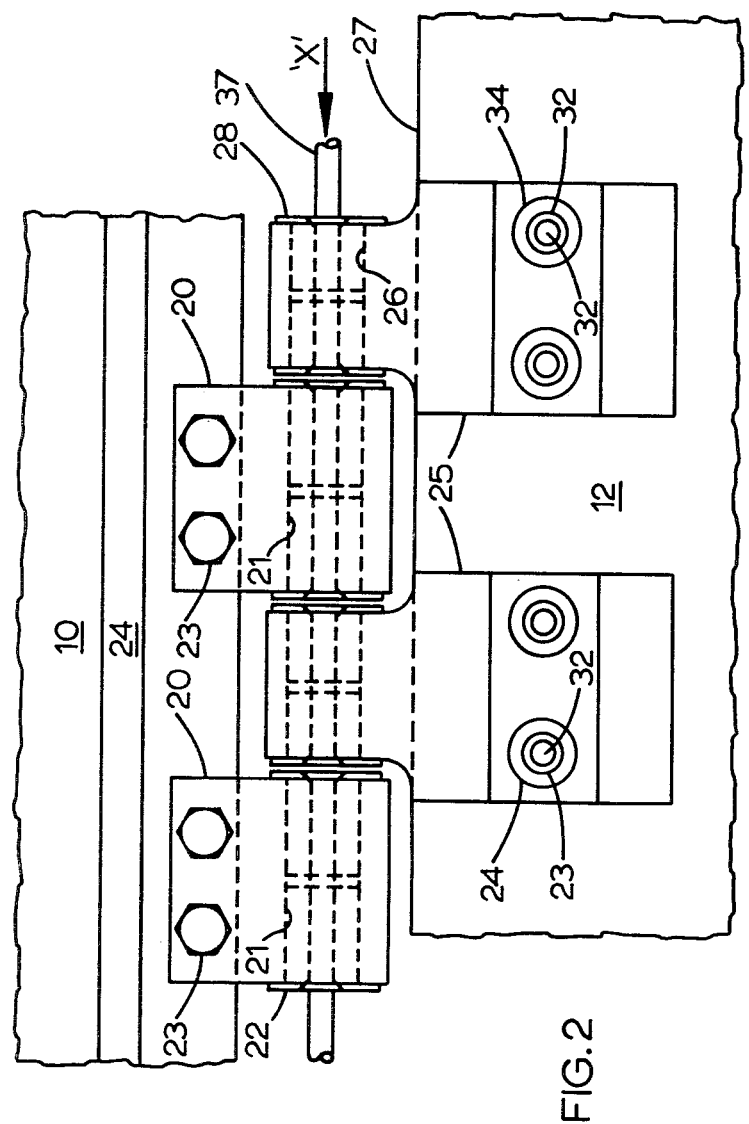
FIG. 2 shows part of an attachment device connecting a component of the flexible skirt to the cushion vehicle.
Figure 3:
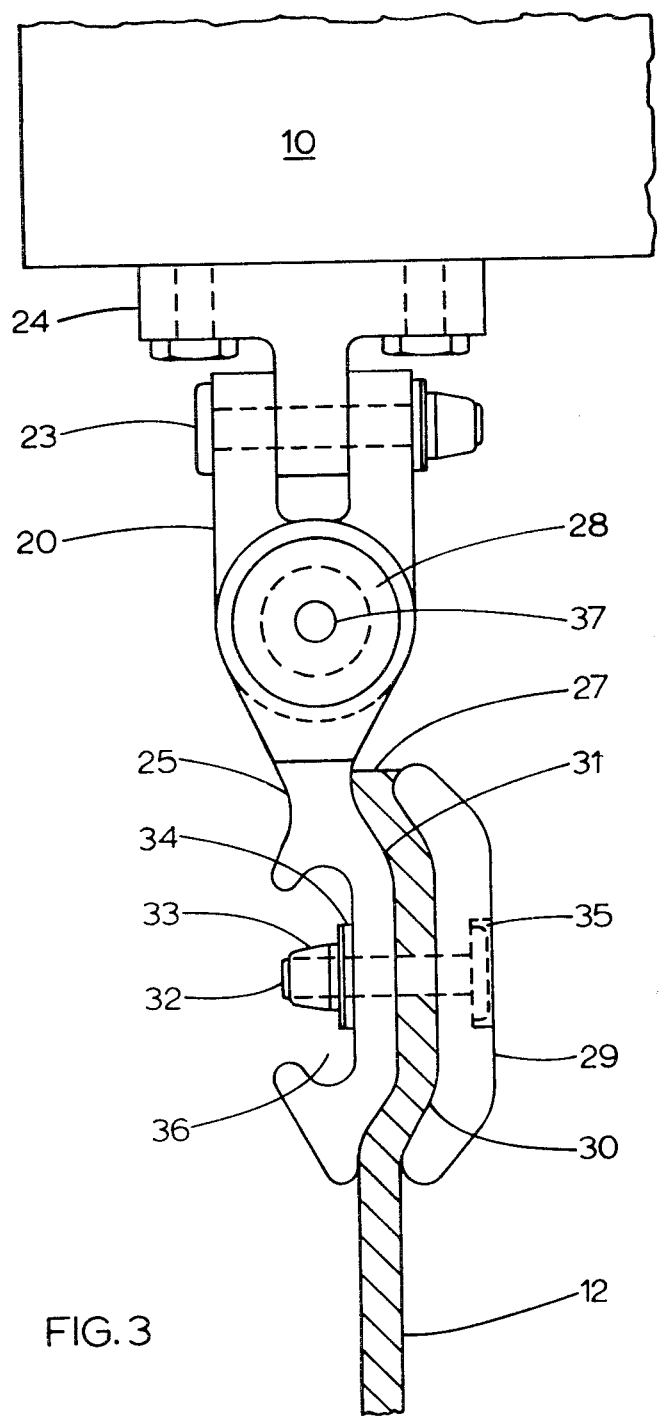
FIG. 3 is a view looking on arrow 'X' in FIG. 2.

A part of an attachment device in accordance with the present invention suitable for releasably connecting the bag member to the vehicle along the attachment lines 13 and 14 is shown in FIGS. 2 and 3. The attachment device comprises a plurality of first elements 20 having passages 21 extending therethrough. The passages 21 are lined with removable hardened steel bushes 22. Each element 20 is forked so as to provide for attachment by bolts 23 to a T-section member 24 that is bolted to the underside of the rigid body structure of the vehicle 10.

A plurality of second elements 25 having passages 26 extending therethrough are attached to an edge portion 27 of flexible sheet material forming the bag member 12. The passages 26 are lined with replaceable hardened steel bushes 28. The attachment of the flexible sheet material to the elements 25 is by way of clamping plates 29. Each clamping plate 29 presents a generally concave clamping face 30 towards a generally convex clamping face 31 on each second element 25. The sheet material is held between these clamping faces 30 and 31, by bolts 32 which pass through aligned holes in the second element 25, the edge portion 27 of the sheet material, and the clamping plate 29, to have collars 33 pushed hard against washers 34 in order to apply a compressing action between the clamping faces 30 and 31 before the collar 33 is swaged into grooves in the shank of the bolt 32 by a swaging tool (not shown). These particular threadless fastening bolts are well known in the art for use in making bolted lap joints between sheets of flexible material forming the bag memeber of the skirt, one particular type of bolt being that referred to as a "Huck Bolt." Recesses 37 are provided in that face of each clamping plate 29 that is opposed to its clamping face 30 so as to house the heads of the bolts 32. A recess 36 is provided in that face of each second element 25 that is opposed to its clamping face 31 so as to house the washers 34 and collars 33.

Figure 4:
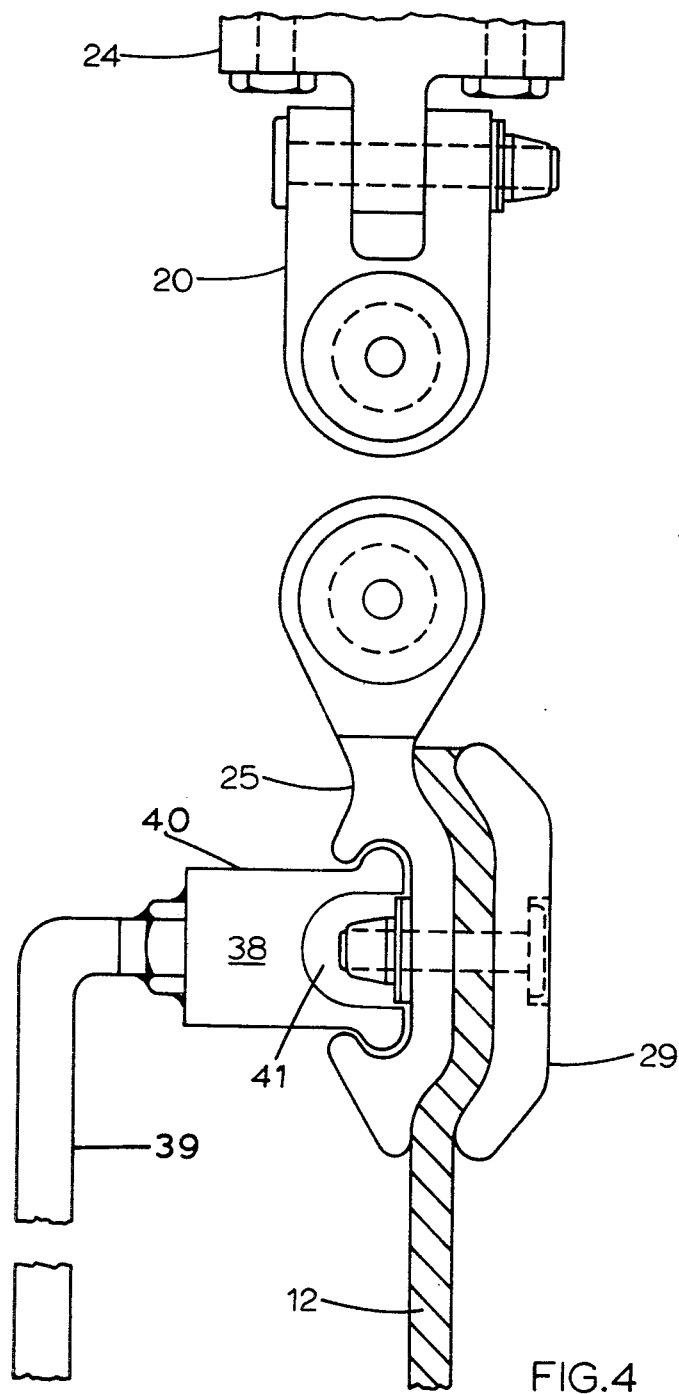
FIG. 4 is a view looking in the same direction as FIG. 3, and showing an element of the attachment device fitted to the skirt being located with an element of the attachment device fitted to the vehicle using a special hand tool.

To attach the bag member 12 to the rigid body structure of the vehicle, it is offered up to the vehicle so that the second elements 25 are located in the spaces between the first elements 20 with the passages 21 and 26 substantially aligned. A pin member 37 is then passed through the bores of the hardened steel bushes 22 and 28 so as to connect the first and second elements in hinged relationship to each other. Location and accurate alignment of the second elements 25 with the first elements 20 is made difficult when fitting skirts to large air cushion vehicles by the problems associated with handling heavy skirt material. A special hand tool 38, shown in FIG. 4, may be used to ease the handling of the skirt during this operation. The tool 38 has a handle portion 39, and a shaped head 40 having a groove 41 in its front face so that the head 40 can be located in the recess 36 in the second element 25 by sliding in from one end. The tool 38 is then used to lift the second element 25, and with it the skirt material, until the second element 25 has been accurately located between two of the first elements 20 and the pin member 37 has been passed through the aligned bores of the bushes 22 and 28. It will be apparent to those skilled in the art that a number of pin members of suitable length will be used to effect connection around the complete periphery of the vehicle, and that one end of the pin member may be bent to form a loop so as to facilitate insertion and withdrawal of the pin.

The first and second elements 20 and 25, respectively, and the clamping plate 29, are manufactured in light alloy, and the pin member 37 is manufactured in steel; however, other suitable metals of plastics materials may be used if desired.

The bag member 12 may be detached from the vehicle 10 by removing the pin members 37 so as to disconnect the second elements 25 from the first elements 20. If the complete bag member 12, or a section of the bag member, is to be scrapped then the second elements 25 are detached from the bag member 12 by splitting the collars 33 with bolt cutters in a known manner so as to allow the bolts 32 to be removed. The second elements 25 and their associated clamping plates 29 are then available for re-use.

We have found that the clamping action between the clamping plate and the second element allows a considerable reduction in the number of fastenings that are required to attach the second element to the bag member. A load applied between the flexible material of the bag member and the vehicle acts to move the clamping plate in a downward direction with respect to the underside of the vehicle, and the second element in an upward direction with respect to the underside of the vehicle. This creates a jambing action between the uppermost portion of the convex clamping surface of the second element and the uppermost portion of the concave clamping surface of the clamping plate so as to relieve the load acting on the bolts which fasten the clamping plate and flexible material of the bag member to the second element, thus allowing the number of fastening bolts to be considerably reduced.

A further advantage of an attachment device in accordance with the present invention is that it gives a choice of two positions for detaching either a section of the bag member or the complete bag member from the vehicle. This may be facilitated by removing the pin members so as to disconnect the second elements from the first elements, or alternatively, the collars holding the bolts may be split by known means so as to release the bolts, the clamping plates then being removed and the material of the bag member disconnected from the second elements without breaking the connection between the first and second elements.

It will be appreciated that whilst the invention has been described hereinbefore with reference to the attachment of a bag member to an air cushion vehicle, attachment devices in accordance with the invention may be used to attach other forms of flexible skirt components to the vehicle.

In a non-illustrated modification of the embodiment shown in FIG. 3, the edge portion 27 of the flexible sheet material may be folded back on itself to form a bead; and then clamped between the second elements 25 and the clamping plates 29. If desired, the material may be folded back on itself around a rope or similar member to form the bead. Such an arrangement may be used to further relieve the load applied to the fastening bolts 32 by the flexible skirt material so that the major portion, if not all, of the loading in the flexible skirt material is passed directly into the second elements, and the load transfer path is not by way of the fastening bolts.

What is claimed is:

1. An attachment device for releasably connecting a flexible skirt component to rigid body structure of an air cushion vehicle, said attachment device comprising a plurality of first elements each having a passage extending therethrough and being arranged for attachment to the rigid body structure of the vehicle so as to be in spaced relationship with next adjacent first elements and with the passages in said first elements substantially aligned, a plurality of second elements each having a curved clamping face and a recess on the opposite face and a passage extending therethrough, said plurality of second elements being arranged for attachment in spaced relationship to next adjacent second elements along an edge portion of flexible sheet material forming a component of a flexible skirt and with the passages in said second elements substantially aligned, a pin member for insertion in the aligned passages of said first and second elements when said second elements are located in the spaces between the first elements whereby said first and second elements are connected in hinged relationship to each other, and a plurality of curved clamping plates having a curved clamping face and a recess on the opposite face and being arranged for co-operation one with each said second element so as to present a curved clamping face towards a complementary curved clamping face on said second element, one face being generally concave and the other face being generally convex whereby in use an edge portion of flexible sheet material forming said skirt component is positioned between said curved clamping faces and held by a clamping action that is applied by releasable fastening means which pass through aligned holes in said second element, said clamping plate, and said flexible material.

2. An attachment device as claimed in claim 1, wherein the releasable fastening means comprize nuts, bolts, and washers.

3. An attachment device as claimed in claim 1, wherein the passages extending through the first and second elements are lined with removable bushes.

4. An attachment device as claimed in claim 3, wherein said bushes are hardened bushes.

5. An attachment device as claimed in claim 1, wherein the first elements are forked so as to facilitate their attachment to a T-sectioned member that is attached to the vehicle.

6. An air cushion vehicle having a flexible skirt releasably connected by an attachment device to rigid body structure of the vehicle, said attachment device comprizing a plurality of first elements attached at spaced positions to said rigid body structure and having aligned longitudinal passages extending therethrough, a plurality of second elements positioned in the spaces between said first elements and having longitudinal passages extending therethrough in alignment with the longitudinal passages in said first elements, said second elements having a curved clamping face and a recess on the opposite face, a pin member extending through said aligned passages of said alternate first and second elements whereby said first and second elements are connected in hinged relationship to each other, and a plurality of curved clamping plates having a curved clamping face and a recess on the opposite face co-operating one with each said second element to present a curved clamping face towards a complementary curved clamping face on said second element and whereby an edge portion of said flexible skirt positioned between said clamping faces is held by a clamping action applied by releasable fasteners which pass through aligned holes in each said second element, each said clamping plate, and said flexible skirt.

7. An air cushion vehicle according to claim 6, wherein the flexible skirt comprises an inflatable bag member formed by reinforced flexible sheet material having opposed edge portions releasably connected to the rigid body structure of the vehicle.

* * * * *